United States Patent [19]

Höhn et al.

[11] Patent Number: 5,438,914
[45] Date of Patent: Aug. 8, 1995

[54] ELECTRIC CIRCUIT FOR CONTROLLING THE HEAT OUTPUT OF HEATING RESISTANCES IN HOUSEHOLD APPLIANCES

[75] Inventors: Dieter Höhn, Riedstadt; Michael Steinle, Frankfurt, both of Germany

[73] Assignee: Rowenta-Werke GmbH, Offenbach am Main, Germany

[21] Appl. No.: 313,380

[22] Filed: Sep. 27, 1994

[30] Foreign Application Priority Data

Sep. 30, 1993 [DE] Germany ................ 9314747 U

[51] Int. Cl.⁶ ............................ A47J 37/08; H05B 1/02
[52] U.S. Cl. .................................. 99/327; 99/329 R; 99/332; 99/342; 99/385; 219/464; 219/492; 219/501; 219/521
[58] Field of Search ............... 99/327, 328, 329 P, 99/329 R, 329 RT, 331–335, 385, 389, 391; 219/449, 460–465, 491–493, 501, 521; 392/347, 383

[56] References Cited

U.S. PATENT DOCUMENTS

| | | | |
|---|---|---|---|
| 3,740,528 | 6/1973 | Wohlfart et al. | 219/492 X |
| 3,956,978 | 5/1976 | Borley | 99/329 R |
| 4,038,520 | 7/1977 | Boller et al. | 219/521 |
| 4,402,258 | 9/1983 | Guarnerio | 99/327 |
| 4,878,423 | 11/1989 | Birkert et al. | 99/332 |
| 5,006,690 | 4/1991 | Cole et al. | 99/328 |
| 5,018,437 | 5/1991 | San Juan | 99/327 |
| 5,044,263 | 9/1991 | Birkert et al. | 99/329 RT |
| 5,054,382 | 10/1991 | Ward et al. | 99/389 |
| 5,088,389 | 2/1992 | Labadia del Fresno | 99/327 |
| 5,283,421 | 2/1994 | Richards | 99/327 |
| 5,385,082 | 1/1995 | Huggler et al. | 219/492 |

FOREIGN PATENT DOCUMENTS

| | | |
|---|---|---|
| 60555 | 4/1987 | European Pat. Off. . |
| 3726535 | 2/1989 | Germany . |
| 3601555 | 3/1990 | Germany . |
| 3919452 | 5/1992 | Germany . |
| 9302596 | 5/1993 | Germany . |

*Primary Examiner*—Timothy F. Simone
*Attorney, Agent, or Firm*—Friedrich Kueffner

[57] ABSTRACT

An electric circuit operating on a single-phase power supply system for controlling the heat output of at least two heating resistances which are electrically connected in parallel and are installed in electric household appliances, particularly toasters, wherein the control is being effected in compliance with flicker standards and without feeding interference back into the power supply system. A switch is connected in series with each heating resistance, wherein the switches are activated by an electronic energizing arrangement. During a heating phase, the switches of the circuit are repetitively asymmetrically cycled in such a way that always only one switch is closed and all other switches are open, wherein the switch which is closed at a given time exclusively permits the through-passage of full waves from the power supply system.

4 Claims, 2 Drawing Sheets

ELECTRIC CIRCUIT FOR CONTROLLING THE HEAT OUTPUT OF HEATING RESISTANCES IN HOUSEHOLD APPLIANCES

BACKGROUND OF THE INVENTION

1. Field of the Invention

The present invention relates to an electric circuit operating on a single-phase power supply system for controlling the heat output of at least two heating resistances which are electrically connected in parallel and are installed in electric household appliances, particularly toasters, wherein the control is being effected in compliance with flicker standards and without feeding interference back into the power supply system. A switch is connected in series with each heating resistance, wherein the switches are activated by means of an electronic energizing arrangement.

2. Description of the Related Art

If two or a plurality of heating elements are arranged in a network composed of heating resistances and are connected in series or in parallel, it may be desirable, for example, in the case of a toaster, to distribute the maximum available heating power between the heating elements optionally either evenly or symmetrically, on the one hand, or unevenly or asymmetrically, on the other hand. This is because the sides of a piece of bread or other substance to be toasted my differ with respect to their properties.

If all the heating elements have identical connected load values, an even distribution of the heating power is automatically obtained when they are connected in series or in parallel. However, when it is desirable for special heating purposes to reduce the output of one or more of the heating elements, this is possible at present only by cyclically repetitive adjustment of the current that flows therethrough by intermittently switching in and out individual heating resistances or all heating resistances. This control can be effected especially by means of phase-angle power control or multicycle-burst power control by utilizing triacs which are connected in series in front of the heating resistances.

Since, in the case of phase-angle power control the first portion of each half-wave is cutoff, the application of this control technique requires as a matter of principle special measures to minimize effects that result in interference being fed back into the power supply system. Since the loads connected to the power supply system are not connected to one another, and since, therefore, the individual current-pause periods will have a statistically random distribution, these current-phase periods must, in the case of many loads, overlap each other in such a way that they cease to be apparent at the electricity generating plant. For this reason, in cases involving relatively high power levels, the current-pause or multicycle-burst control techniques have generally favorable effects on the power supply system. For controlling the power input to high-rating loads, especially those with a certain lag characteristic, such as heating resistances, repetitive cycling by means of the generally preferably multicycle-burst control technique is nevertheless subject to very rigorous restrictions because of the presence of so-called flicker standards (e.g. EN 60555, Part 3). Because of the fact that, for a given supply-system line impedance, the switching of a load will always give rise to fluctuations in the supply-system line voltage, which, in turn, will give rise to noticeable fluctuations in the intensity of the light produced by any illuminating devices connected at the time, narrow limits are set with respect to repetitive cycling of loads because of the existence of flicker standards, i.e., standards that specify permissible cycling rates. In practice, this results in very low permissible cycling rates in cases involving the repetitive cycling of high heating power, as required particularly in household appliances, such as toasters and stoves. For example, in the case of a 1500 W heating system on a 230 V public power supply system, the permissible cycling rate is limited to approximately 11 switching operations per minute (calculated from the percentage voltage drop as the prescribed standard supply-system line impedance of $0.4+0.25i$ ohm and read from the permissible flicker curve). This low permissible cycling rate is only of little practical value, especially in cases involving open toaster-type heating elements with very small heating time constants because switching-off results in a rapidly following loss of the shorter-wave length infrared radiation that is significant with respect to the toasting process.

German Patent 39 19 452 discloses a toaster which has two heating resistances connected in parallel. Each heating resistance is preceded by a switching transistor connected in series. The switching transistors are activated by an electronic control device. The two heating resistances are located on both sides of a toasting slot which is especially intended for receiving slices of bread. Appropriate switching means are provided for the purpose of switching the heating resistances in such a way that one of two alternative modes of operation can be selected i.e., the supply of a pulsating direct current to only one heating resistance at a time, or to both heating resistances simultaneously. This toaster makes possible an asymmetrical operation in which the available heating power is distributed between the two heating elements in the proportion of 100% to 0 percent. Circuits of this type, i.e. for half-wave operation of appliances with power ratings exceeding 200 W, do not comply with relevant standards and, therefore, the use of such circuits is prohibited. Moreover, even if circuits of this type were permitted to be connected to the public power supply system, it would be necessary to use very expensive bipolar transistors with a high blocking voltage and with an ability to conduct high forward or on-state currents.

German Patent 36 01 555 discloses a control arrangement for the stepwise switching of the power input to an electric water heater of the continuous-flow type in dependence on the demanded output, wherein the heater has a parallel network of heating resistances which are installed in the water flow duct of the heater and through which patterns of power supply half-waves representing different power levels are conducted either cumulatively or alternately, and wherein these patterns are stored in a memory device. In addition to providing finely graduated power control by means of the multicycle-burst control technique, this arrangement is capable of producing a very substantial reduction in the occurrence of supply-line voltage fluctuations due to switching operations and, in particular, a very substantial reduction in the flickering of lighting units connected to the power supply system. However, because of the fact that sets of power supply half-waves are being switched, special measures have to be taken in order to provide a reliable guarantee that no direct-current component occurs in the time-averaged load current, i.e., that exactly equal numbers of positive and negative power supply half-waves are switched through.

U.S. Pat. No. 5,088,389 discloses a circuit arrangement of the above-described type for controlling the heat output of two heating resistances for a toaster connected in parallel, wherein a triac, controlled by the power supply zero voltage, is connected in series immediately before each heating resistance and the heating power that is input either to only one heating resistance or to both heating resistances is adjusted, either asymmetrically or symmetrically, by repetitive cycling accomplished by means of the multicycle-burst control technique. As the heat-holding timer cycles repetitively, cyclic switching-in and switching-out of both heating elements together is achieved, and the power is thereby reduced to a level that is intended to keep the toasted contents of the toaster warm. This control arrangement has the disadvantage that the mode of operation is based on the assumption of a constant heat output over the duration of a toasting cycle, and that no measures are taken to perform the repetitive cycling in compliance with flicker standards and without feeding interference back into the power supply system.

SUMMARY OF THE INVENTION

Therefore, it is the primary object of the present invention to achieve a substantial increase in the permissible cycling rate when a circuit arrangement of the above-described type for controlling heating power is connected to a single-phase alternating-current power supply system, wherein the control is effected by means of the multicycle-burst control technique in compliance with flicker standards and without feeding interference back into the power supply system. The principal purpose of achieving the substantial increase in the permissible cycling rate, which principally concerns an especially fast-toasting bread toaster, is to generate a uniform radiation temperature or constancy of heating which is important with respect to good toasting behavior, and to accomplish this by means which make it possible to generate this uniform radiation temperature either on one side or on both sides of the piece of bread or other substance to be toasted. At the same time, it is the object of the present invention to completely avoid the disadvantages of prior art electric circuit arrangements of this type, i.e., the feeding of interference back into the power supply system as a consequence of the creation of harmonics caused by switching operations, and the generation of direct-current components which is a possibility that cannot be ignored.

In accordance with the present invention, during a heating phase, the switches of the circuit are repetitively asymmetrically cycled in such a way that always only one switch is closed and all other switches are open, wherein the switch which is closed at a given time exclusively permits the through-passage of full waves from the power supply system.

When explained with reference to the example of a conventional toaster with two heating elements located to the right and left of the piece of bread or other substance to be toasted, the configuration according to the present invention means that the two heating elements are initially operated during a preheating phase in parallel for full output and, except for the switching-on and switching-off operations, are never switched simultaneously during the subsequent heating operation at reduced output. As a result of this measure, there is a reduction in the power which is relevant to flickering, and this measure requires the provision of an electronic full-wave switch for each heating side which is capable of switching half the maximum total power. As a result, it is possible to achieve substantially faster cycling rates and, consequently, smoother power input characteristics.

According to the invention, during a heating phase, the switches which are each connected in series to one of the heating resistances, are alternately opened and closed in continuous, immediate succession, wherein one switch is open during an open period which corresponds to the closed period of the other switch, i.e., current is carried by one circuit branch alone and alternating with the other branch in immediate succession while the accompanying voltage or current wave-forms on the parallel current-carrying branches recombine outside of the resistance network connected in parallel in order to produce voltage or current wave-forms which are smooth and uninterrupted. Accordingly, the total power consumed by the individual heating resistances in the toaster is distributed over the individual resistances as time passes in such a way that only a proportion of the power is connected at any given time, wherein this proportion is equal to the total power divided by the number of heating elements. As far as the alternating-current power supply system is concerned, the present invention provides that the sequential power distribution process proceeds uninterruptedly, so that the total output corresponds to the individual heat output of one of the heating resistance which are connected in parallel.

The present invention produces the result that no flickering occurs and, in addition, no direct-current voltage component occurs in the power supply system because of the fact that the heat resistances which are connected in parallel are energized by the full waveform, preferably by means of zero-voltage-controlled power semiconductors. Furthermore, the radiation temperature of the heating resistances which is significant with respect to toasting remains virtually constant. This is because the individual heating elements are repetitively cycled at a frequency that is high in relation to the time constants defining the heating and cooling behavior of the heating resistances.

Because of the fact that the power input to the total system composed of the plurality of heating resistances remains constant, all effects that could result in interference being fed back into the power supply system are avoided, despite the variable adjustment of the heating power output at each individual heating resistance.

In the energizing procedure carried out in accordance with the invention, it is especially advantageous that the magnitudes of heating power consumed in each parallel current branch can be adjusted not only to effect a symmetrical distribution, but also an asymmetrical distribution. Because the amounts of power to be consumed in the parallel current branches can be varied or adjusted, the toasting conditions can be adjusted to suit pieces of bread or other substances that have dissimilar surfaces, i.e., pieces with a different surface on each side (e.g. freshly cut surface as opposed to already baked surfaced). As a result of different degrees of drying or earlier browning, or as a result of an earlier formation of a crust, it may actually happen that burning effects easily occur on the uncut side, while the cut side may still not have been toasted to a sufficient degree. This disadvantage inherent in prior art arrangements can be eliminated especially advantageously, in accordance with the invention, by means of an adjustable asymmetrical distribution of the heat output in those heating elements which are located at the front side and rear side, respectively, of the piece of bread or other substance to be toasted.

In accordance with another embodiment, the electronic energizing arrangement can be provided with a memory device for storing patterns of power supply system half-waves, or with a generator for generating such patterns in accordance with an algorithm.

For an especially fast toasting procedure, a further embodiment of the present invention provides that the heating phase is directly proceeded by a brief preheating phase lasting approximately 5 seconds, during which preheating phase all switches are closed and the heating resistances are operated at full output.

Compared to prior art circuit arrangements, the present invention provides the advantage that a full-power warm-up is carried out, wherein a preliminary time-limited preheating phase at maximum heat output is introduced, even when the desired heat outputs are low. This feature results in substantial shortening of the total toasting time up to the moment at which the desired degree of toasting is reached because the time to reach a radiation temperature that is significant as regards the toasting process is drastically shortened.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
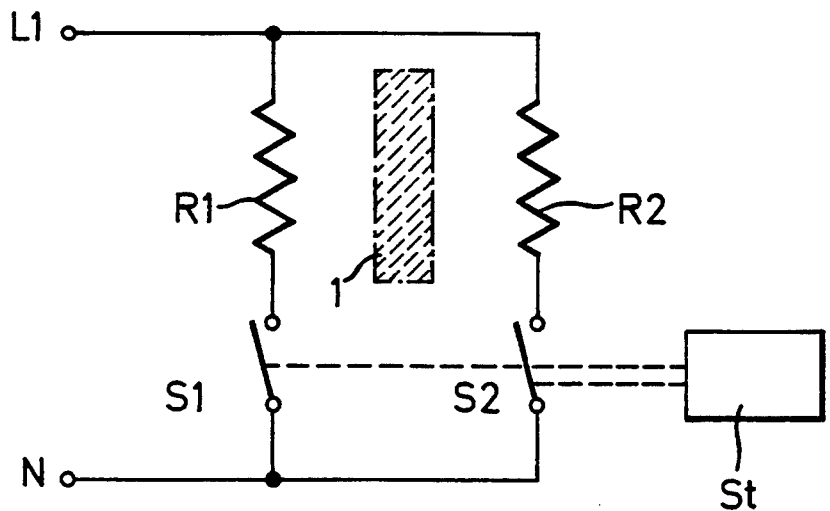
FIG. 1 is a schematic block diagram of a circuit arrangement according to the present invention for a toaster with two heating resistances which are located on the two sides of a piece of bread or other substance to be toasted.

FIG. 1 of the drawing is a block diagram of the circuit arrangement energized in accordance with the present invention. The circuit arrangement is intended for a toaster which is operated on a single-phase power supply system L, N and is provided with two heating resistances $R_1$, $R_2$ which extend parallel to each other and are located on the two sides of a piece of bread 1, shown in broken lines, or other substance to be toasted.

A switch $S_1$, $S_2$, preferably a triac, is connected in series before each heating resistance, wherein the switches $S_1$, $S_2$, are activated via an electronic energizing arrangement St. If both switches are closed, the heat output of the total system corresponds to twice that of an individual heating resistance $R_1$, $R_2$.

Figure 5:
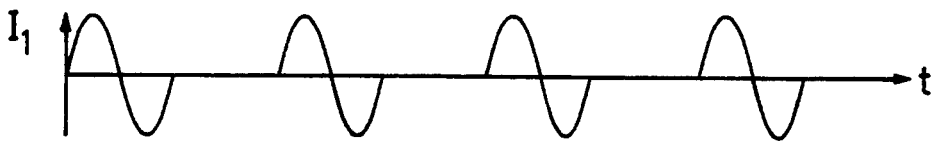
Figure 5:
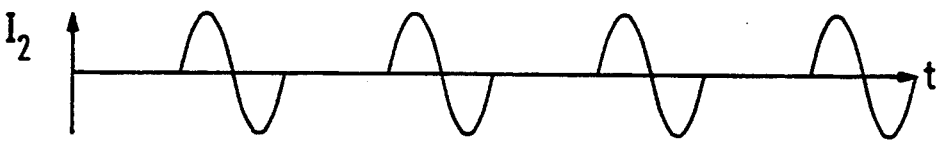

If both switches $S_1$, $S_2$ are alternately closed for equal periods of time, i.e., if only one switch $S_1$, $S_2$ is closed at any given time, the heat output of the total system corresponds to the single output of an individual heating element $R_1$, $R_2$. This corresponds to a symmetrical distribution of the heating power in the ratio 1:1 as illustrated in FIG. 5.

Figure 3:
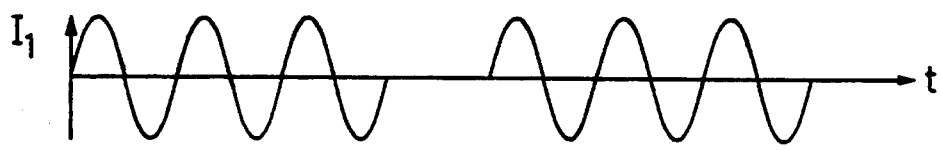
FIGS. 3-5 are diagrams showing examples of asymmetrical and symmetrical heating power distributions in the ratios 3:1, 1:3 and 1:1, respectively.
Figure 3:
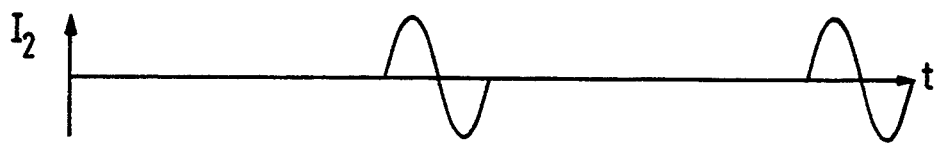
Figure 4:
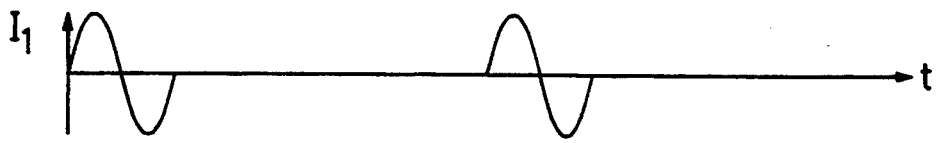
Figure 4:
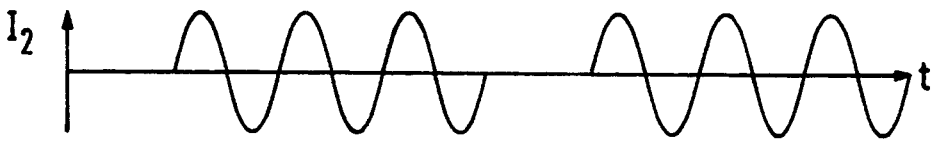

FIGS. 3 and 4 show an asymmetrical distribution of the heating power between the two heating resistances $R_1$, $R_2$ in the ratios of 3:1 and 1:3, respectively. If the two switches $S_1$, $S_2$ are alternately closed for unequal periods of time, an asymmetrical distribution of the heating power is established within the total system, while at the same time the total current input remains constant. This asymmetrical distribution makes it possible in an advantageous manner to toast pieces of bread or other substances with toastable surfaces that differ from one another, so that adjustments can be made for taking into account their dissimilarities. In the case of a baking oven, this makes it possible to distribute heat between the upper and lower zones of the oven while at the same time the power input remains constant.

Figure 2:
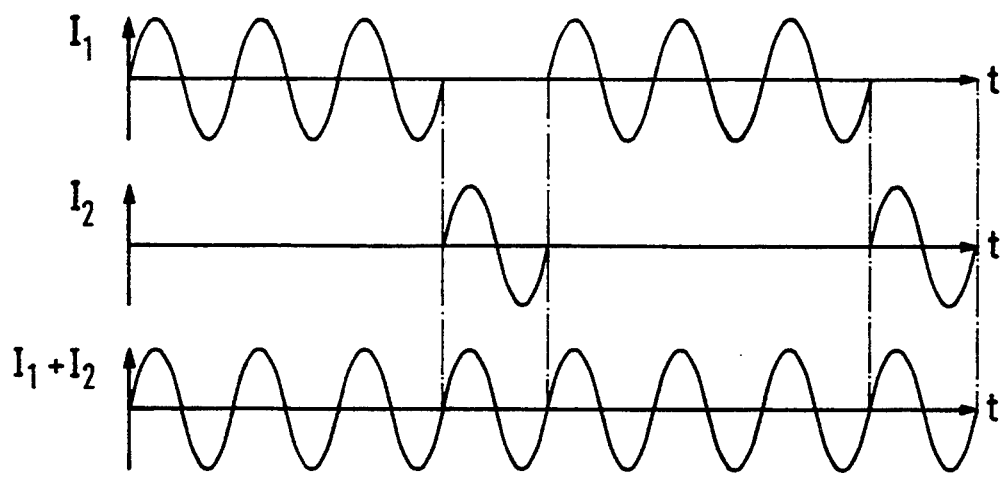
FIG. 2 shows an $I_1(t)$ diagram in a first heating resistance, a $I_2(t)$ diagram in a second heating resistance and the I(t) diagram outside the parallel network.

FIG. 2 of the drawing shows an $I_2(t)$ diagram for the first heating resistance $R_1$, an $I_2(t)$ diagram for the second heating resistance R2, and a I(t) diagram for showing the current input to the total system as a function of time, wherein the diagrams represent the conditions which are established when the switches S1, S2 are activated in accordance with the invention.

The invention is not limited by the embodiments described above which are presented as examples only but can be modified in various ways within the scope of protection defined by the appended patent claims.

We claim:

1. An electric circuit on a single-phase power supply system for controlling a heat output of at least two heating resistances which are electrically connected in parallel and are installed in an electric household appliance, wherein control is effected in compliance with flicker standards and without feeding interference back into the power supply system, the circuit comprising a switch connected in series with each heating resistance, an electronic energizing arrangement for activating the switches, the electronic energizing arrangement comprising means for activating the switches during a heating phase in a repetitively asymmetrically cycled manner, such that always only one of the switches is closed and all other switches are open, and such that the switch which is closed at a given time exclusively permits through-passage of full waves from the power supply system.

2. The electric circuit according to claim 1, comprising a zero voltage-sensing detector for controlling the switches with reference to the zero voltage of the power supply system.

3. The electric circuit according to claim 1, comprising a memory device for storing patterns of power supply system half-waves.

4. The electric circuit according to claim 1, comprising a a generator for generating patterns of power supply system half-waves in accordance with an algorithm.

* * * * *